(12) United States Patent
Goad (10) Patent No.: US 7,967,522 B2
(45) Date of Patent: Jun. 28, 2011

(54) REINFORCED RAILING SUPPORT CONNECTOR AND GRAB RAILING

(76) Inventor: Eugine W. Goad, Dayton, MN (US)

( * ) Notice: Subject to any disclaimer, the term of this patent is extended or adjusted under 35 U.S.C. 154(b) by 946 days.

(21) Appl. No.: 11/251,990

(22) Filed: Oct. 17, 2005

(65) Prior Publication Data

US 2007/0086852 A1    Apr. 19, 2007

(51) Int. Cl.
*F16B 7/00* (2006.01)
*F16B 12/36* (2006.01)
*F16B 13/00* (2006.01)
(52) U.S. Cl. .......................... 403/292; 403/205; 211/123
(58) Field of Classification Search ............... 403/62, 403/64, 119, 169, 170, 174, 178, 205, 223, 403/286, 291, 292, 295, 298, 306, 171, 176, 403/294; 256/306, 51, 65, 65.16, 60, 67, 256/65.01; 248/251; 211/105.1, 105.2, 123, 211/182.16, 182
See application file for complete search history.

(56) References Cited

U.S. PATENT DOCUMENTS

| | | | | |
|---|---|---|---|---|
| 1,975,244 A | * | 10/1934 | Wiseman | 439/287 |
| 2,147,879 A | * | 2/1939 | Burmeister | 403/26 |
| 2,193,306 A | | 3/1940 | Tinnerman | |
| 2,507,881 A | * | 5/1950 | Bennett | 403/301 |
| 2,773,671 A | * | 12/1956 | Leibensperger | 403/306 |
| 2,839,320 A | * | 6/1958 | Hill | 403/172 |
| 3,000,656 A | * | 9/1961 | Hollaender | 403/298 |
| 3,233,871 A | | 2/1966 | Schroer | |
| 3,342,511 A | * | 9/1967 | Galloway | 285/149.1 |
| 3,386,590 A | | 6/1968 | Gretz | |
| 3,405,915 A | | 10/1968 | Blum et al. | |
| 3,489,392 A | | 1/1970 | Thom | |
| 3,568,220 A | * | 3/1971 | Dees | 4/576.1 |
| 4,283,152 A | * | 8/1981 | Smith et al. | 403/3 |
| 4,398,840 A | * | 8/1983 | French | 403/98 |

(Continued)

FOREIGN PATENT DOCUMENTS

DE    3319330 A1    * 11/1984

OTHER PUBLICATIONS

Disability Products Inc Grab Bars Nov. 11, 2000 3 Pages, pp. 1-3 Pub. Disability Products Inc.

(Continued)

*Primary Examiner* — Michael P Ferguson
*Assistant Examiner* — Nahid Amiri
(74) *Attorney, Agent, or Firm* — James V. Harmon; Nikolai & Mersereau, P.A.

(57) ABSTRACT

A reinforced connector for supporting a tubular grab railing has an upper tubing support that is aligned with the grab railing during use and a lower base portion which is attached to the tubing support, and is fastened a wall or floor as a pedestal for the tubing support. The tubing support has an opening extending longitudinally thereof that divides it into upper and lower halves with the reinforcing plate held between them. The halves of the tubing support are aligned with one another to form at least one boss that is constructed and arranged to engage and support one end of a section of the grab railing tubing. The connector assembly which supports a section of grab railing is formed from dissimilar structural materials including an outer plastic resinous connector element and a reinforcing plate. The reinforcing plate extends through the support to provide reinforcement for the tubing support including each boss and the tubing itself.

9 Claims, 6 Drawing Sheets

U.S. PATENT DOCUMENTS

| | | | |
|---|---|---|---|
| 4,603,904 A | | 8/1986 | Tolleson |
| 4,647,241 A | * | 3/1987 | Weber ............................ 403/18 |
| 4,691,818 A | | 9/1987 | Weber |
| 4,706,367 A | * | 11/1987 | Garringer ................. 29/525.05 |
| 4,725,027 A | * | 2/1988 | Bekanich ................... 248/125.8 |
| 4,864,795 A | * | 9/1989 | Burg ............................ 52/646 |
| 5,050,252 A | * | 9/1991 | Cuttriss .......................... 4/576.1 |
| 5,098,216 A | * | 3/1992 | Caperton ...................... 403/341 |
| 5,421,666 A | | 6/1995 | Spears |
| 5,429,417 A | | 7/1995 | Kim |
| D381,745 S | * | 7/1997 | Owens ......................... D24/128 |
| 5,690,237 A | * | 11/1997 | Marzec ...................... 211/105.1 |
| 5,803,647 A | | 9/1998 | Hughes |
| 5,890,763 A | * | 4/1999 | Asbjørnsen ................... 297/285 |
| 5,908,260 A | * | 6/1999 | Watson et al. .................... 403/4 |
| 6,095,713 A | * | 8/2000 | Doyle et al. .................... 403/97 |
| 6,430,759 B1 | * | 8/2002 | Beltran .......................... 4/576.1 |
| 6,634,823 B2 | * | 10/2003 | Sciortino ....................... 403/13 |
| 6,663,312 B2 | * | 12/2003 | Cary et al. ...................... 403/69 |
| 6,672,552 B1 | * | 1/2004 | Jao ............................... 248/251 |
| D492,530 S | * | 7/2004 | Chen ............................ D6/549 |
| 6,817,044 B1 | * | 11/2004 | Ouyoung ...................... 4/576.1 |
| D503,061 S | * | 3/2005 | Fuchs ............................ D6/549 |
| 6,942,190 B1 | * | 9/2005 | Lu ............................. 248/309.3 |
| 7,044,450 B2 | * | 5/2006 | Striebel et al. ............. 256/65.16 |
| 2004/0101354 A1 | | 5/2004 | Nakahori |

OTHER PUBLICATIONS

C.D. Sparling Co. Modular Grab Bars 2 Pages, pp. 1&2 Pub. CD Sparling Co. Plymouth MI.

* cited by examiner

REINFORCED RAILING SUPPORT CONNECTOR AND GRAB RAILING

FIELD OF THE INVENTION

This invention relates to railings and more particularly to safety railings that are commonly referred to as grab bars and to connectors therefor.

BACKGROUND OF THE INVENTION

Because of safety concerns, particularly in bathrooms and showers which may have wet floors that make it possible for a person to fall, and concern for physically impaired individuals, it has become common to provide safety railings often called grab bars in bathrooms and around showers and bathtubs. Grab bars are particularly helpful and are frequently required by building codes to aid physically impaired individuals. Applicable building codes include stringent strength requirements. Consequently, grab bar systems now in use are formed from metal such as stainless steel or aluminum in order to have the strength needed to meet code requirements and accordingly are relatively expensive and have decorative and aesthetic limitations. While plastic grab bars have been previously proposed, e.g., formed from a plastic polymer as described, for example, in U.S. Pat. No. 5,690,237, it is difficult or impossible for plastic to meet the strength requirements set by building codes and they weaken with age. In addition, the patented device is not suited for use with commercially available tubing. Another problem is the difficulty associated with drilling holes and inserting grab bar mounting screws through a mounting flange often in a location that is beneath or behind the horizontally extending portions of the grab bar support unit. Thus, when a workman attempts to mount a grab bar support unit, he must drill holes and mount screws that are beneath or almost beneath the horizontal part of the grab bar support. This is time consuming, labor intensive, and often results in screws that are cocked to one side.

In view of these and other deficiencies of the prior art, it is one object of the present invention to provide a grab bar mounting assembly that exhibits outstanding performance, is easy to install, is rugged in construction and provides the appealing visual qualities of plastic, yet has the strength of steel so as to meet or exceed building codes, regulatory agency, and industry requirements.

Another object of the invention is to provide improved grab railing mounting hardware that can be readily manufactured from injection molded, thermo-formed or thermo-set plastic resin in any color and yet has the strength of steel.

A further object is to provide an improved mounting assembly for tubular grab railings of modular construction with interchangeable parts that can be readily assembled on site to meet dimensional and design requirements of any particular installation job.

Still another object is to provide a mounting system for tubular grab railings that has a more appealing appearance and better decorative possibilities than grab railings now in commercial use.

Another object is to provide a mounting connector assembly for tubular grab railings that will work with various kinds of commercially available metal or plastic tubing.

Another object is to provide a grab railing mounting connector assembly with a provision for preventing rotation of the tubing during use so that the user will have secure support.

These and other more detailed and specific objects of the present invention will be better understood by reference to the following Figures and detailed description which illustrate by way of example but a few of the various forms of the invention within the scope of the appended claims.

BRIEF DESCRIPTION OF THE DRAWINGS

The present invention will be described below with reference to the accompanying drawings wherein the same numerals represent like structures in the several Figures and wherein.

SUMMARY OF THE INVENTION

Briefly, the present invention provides a reinforced supporting connector and a tubular grab railing. The connector comprises an upper tubing support or fitting that is aligned with the grab railing during use and a lower mounting base portion that is attached to the tubing support and is fastened a wall, floor, or other surface as a pedestal for the tubing support. The tubing support can be split or otherwise provided with an opening extending longitudinally which contains a reinforcing member extending longitudinally of the tubing support. The tubing support has at least one boss that is constructed and arranged to engage and support one end of a section of the grab railing tubing. The invention thus provides a composite connector assembly for supporting a section of grab railing; the composite connector being formed from dissimilar structural materials comprising an outer plastic resinous supporting element that is exposed to view and tactile contact by the user and a hidden reinforcing member which is recessed therewithin and typically is a metal. Each boss is constructed and arranged to engage one end of a section of the tubular grab railing. The reinforcing member can be a plate that extends through the support to provide reinforcement for the tubing support including the boss as well as the tubing itself. A supporting base is attached to the tubing support to fasten the connector to a wall, floor, or other surface. The invention also provides an adjustable connector including two pivotally related portions with a joint between them to permit adjustment on site for establishing the desired angle of intersection between two adjoining grab bar railing sections and an elbow with a right angle bend that can be used for inside or outside railing corners, end extensions, and screw cover.

DETAILED DESCRIPTION OF THE PREFERRED EMBODIMENTS

Figure 1:
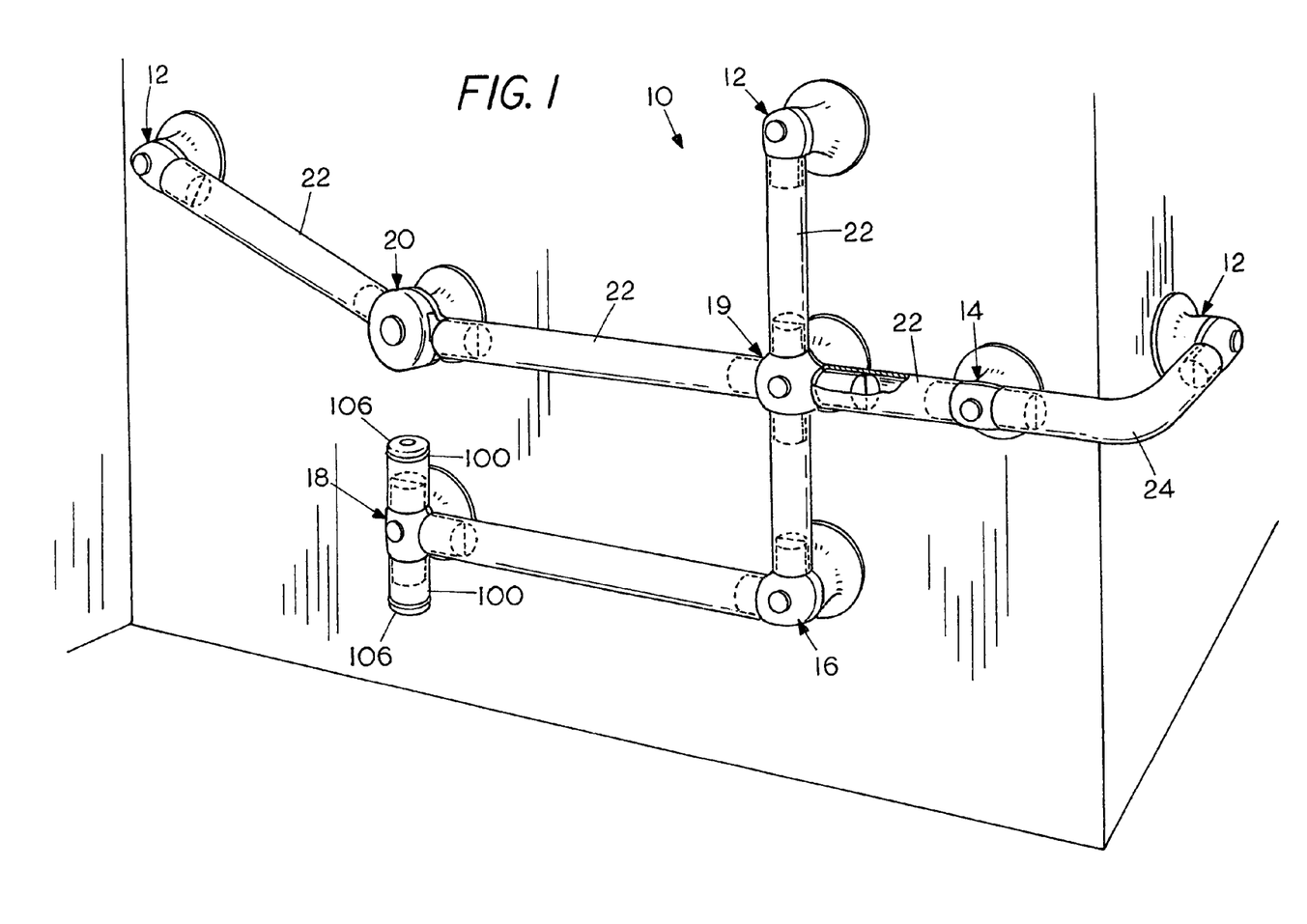
FIG. 1 is perspective view of a grab railing mounted for use on the walls of a building by way of example to show several tubing connectors embodying the invention for supporting different numbers of tubes.

With reference to the Figures and particularly FIG. 1, a tubular grab railing and supporting connectors in accordance with the invention is indicated generally by the numeral 10. The supporting connectors, all of which embody the invention, must, as in any railing system, support different members of railing sections at various angles and accordingly are provided with different numbers of tubing support members. FIG. 1 shows by way of example, connectors embodying the invention can be used with different numbers of tubes and include the following: three end connectors designated 12, one straight connector 14, one L connector 16, one T connector 18, one X connector 19, and one adjustable connector 20. Mounted between the connectors 12-20 are sections of commercially available metal or plastic tubing 22 which may be pre-cut or cut to length by workmen on site during installation. A section of tubing 24 having a right angle bend that can be used as an inside or outside elbow is shown at the right in FIG. 1 in a position mounted between the connectors 12 and 14. Tubing 22 can also be metal having a plastic outer sheath or a coating of paint.

Figure 2:
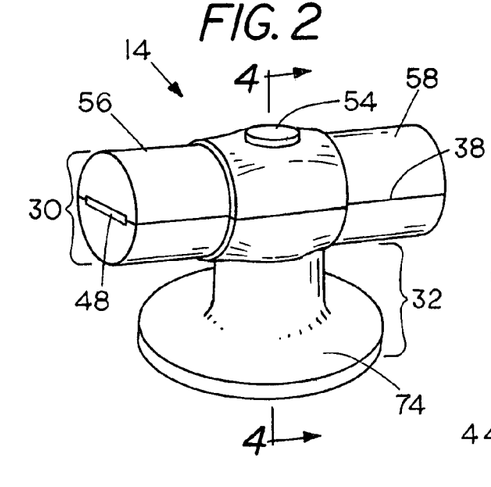
FIG. 2 is a perspective view of a straight connector 14 of FIG. 1 shown on a larger scale.
Figure 3:
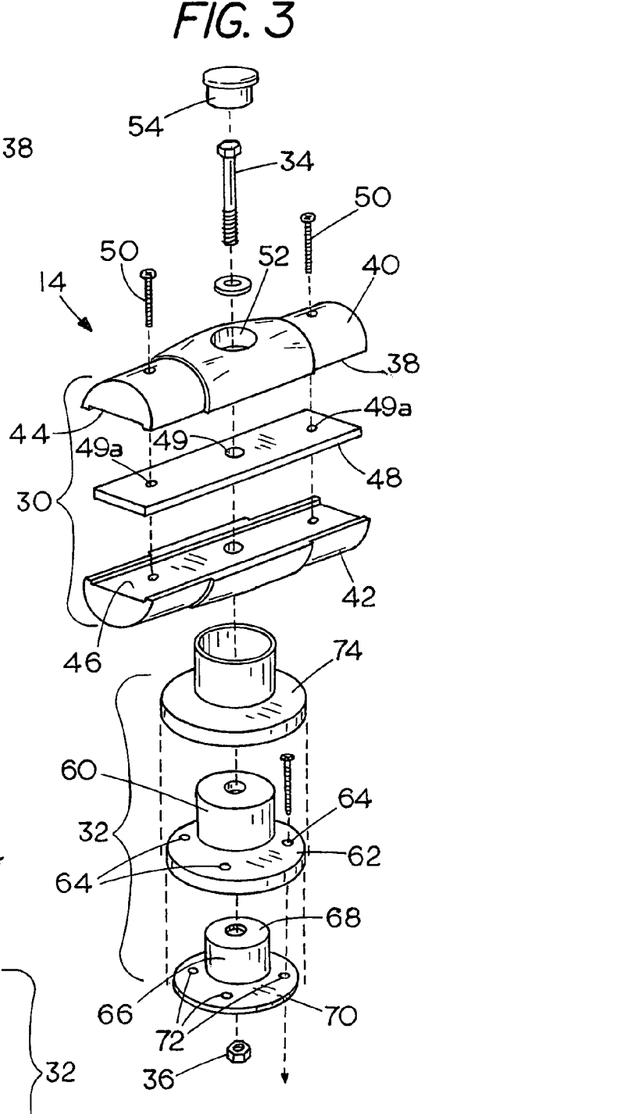
FIG. 3 is an exploded view of the connector of FIG. 2.
Figure 4:
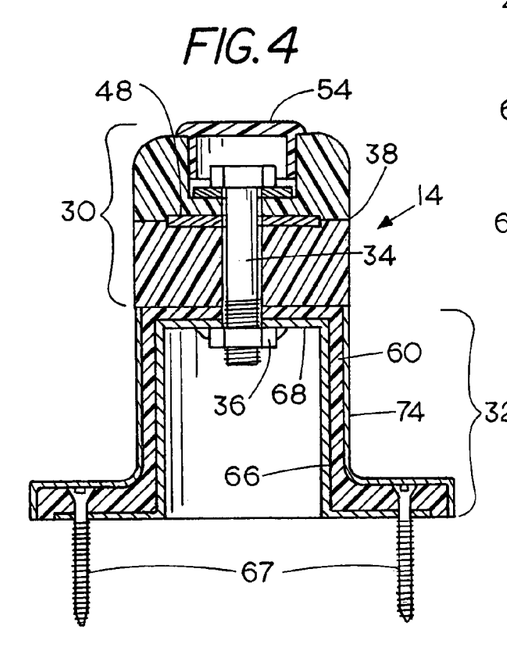
FIG. 4 is a vertical sectional view taken on line 4-4 of FIG. 2.
Figures 5, 6:
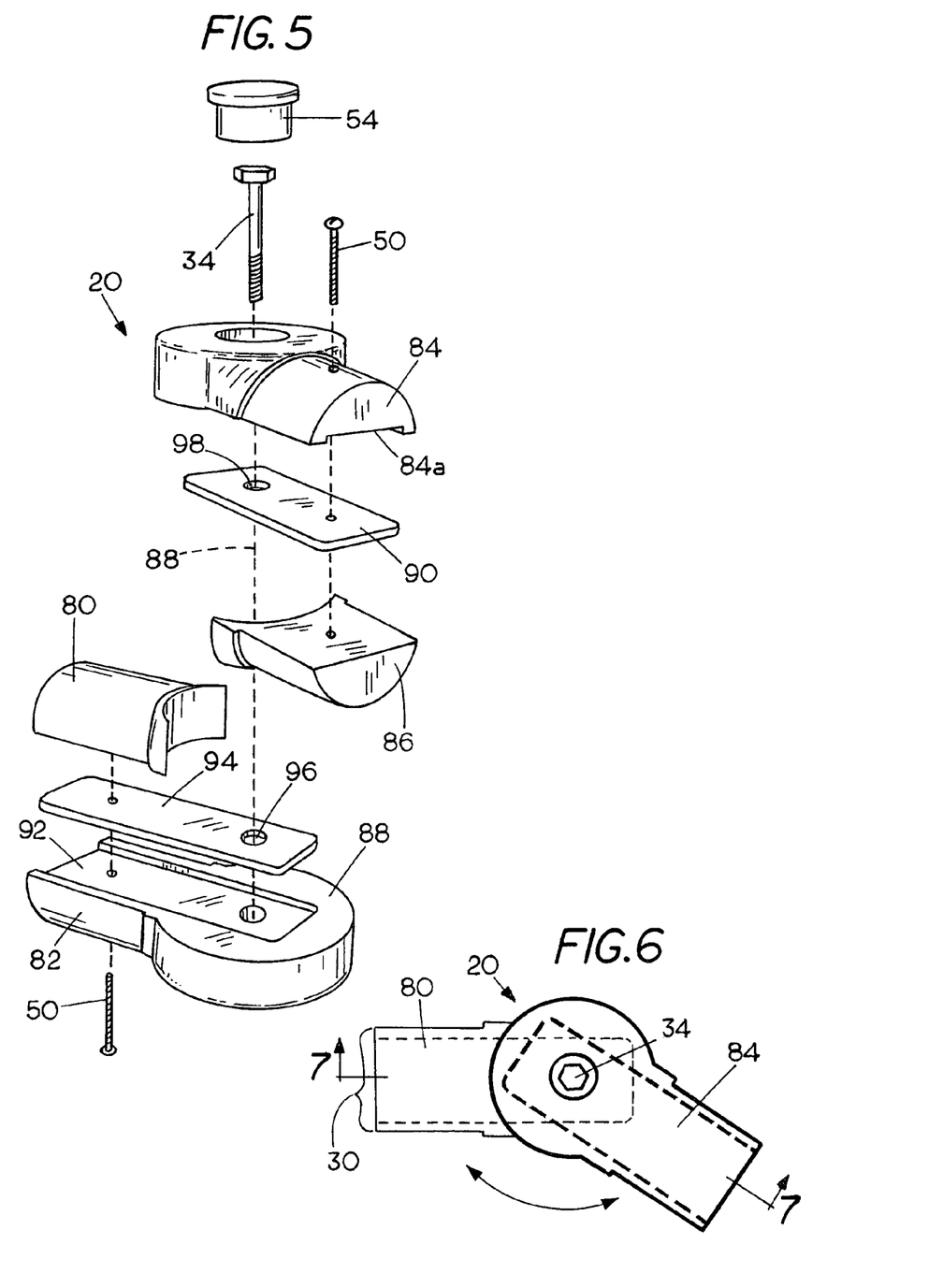
FIG. 5 is an exploded view of an adjustable connector 20 of FIG. 1 in accordance with the invention on a larger scale.
FIG. 6 is a plan view of the adjustable connector of FIG. 5 when assembled.

The straight connector 14 will now be described in more detail by reference to FIGS. 2-4. The connector 14 includes an upper split connector tubing support portion 30 and a lower upright mounting base portion 32 that is connected to the upper portion by a suitable fastener such as a bolt, pin, screw, rivet, or the like, all for convenience referred to herein simply as a fastener. In this case, the fastener is a bolt 34 that is attached to the base 32 by a nut 36 which is welded to the metal reinforcing base. The upper tubing support 30 is split longitudinally along a separation line 38 into upper and lower halves 40 and 42 with cooperating recesses 44 and 46 confronting one another that are of the appropriate size to receive a metal reinforcing plate 48 which is bored or has a punched opening 49 at the center and at each end at 49a for the bolt 34 and for screws 50 respectively which join the upper and lower halves of the tubing support 30. Plate 48 can be flat as shown or, if desired, can be corrugated or embossed. The central opening 49 for the bolt 34 is larger than the peripheral openings 49a for the screws 50. The reinforcing plate 48 is preferably a metal stamping formed from steel which extends through a pair of bosses 56 and 58 from one end of the upper tubing support portion 30 to the other. It can be seen that the fastener 34 secures the halves 40 and 42 together and at the same time fastens the upper tubing support portion 30 rotatably to the base 32. A socket 52 is provided in the top half 40 for the bolt 34 which following assembly is covered with a security cap 54 that is non-removable or only removable with a special tool (not shown). The tubing support 30 is elongated laterally and in this case includes two opposed bosses 56 and 58 which could be circular in cross-section but are most preferably of oval configuration, i.e., out of round to receive and support the ends of grab rail tubing sections 22 as shown in FIG. 1. The bosses are constructed and arranged to have a sliding fit within the ends of the tubing sections 22. If standard commercially available tubing is used by the installer, the ends of each tube section can be given an oval shape, e.g,. by striking each end lightly with a hammer after being cut to size to fit the bosses 56 and 58. In this way the tubing sections 22 will be unable to rotate on the bosses 56 and 58 so as to provide firm, secure, and reliable support for a person using the grab railing 10.

The upper and lower halves 40 and 42 of the tubing support 30 are formed from a plastic resinous material of any suitable composition, e.g., polypropylene, nylon, PVC, polyester, polystyrene, Plexiglas, or other resin which has appealing visual qualities and is warm to the touch because of its relatively low thermal conductivity. The reinforcing plate 48 can be formed from any suitable material of high tensile strength such as steel.

The base 32 comprises a hollow body 60 formed from plastic resin with a horizontal mounting flange 62 at its lower end that is bored at 64 for mounting screws 67 used to attach the base 32 to a wall, floor, or other surface. Inside the plastic body 60 is a tubular or deep drawn metal reinforcing member 66 with an upper horizontal end wall 68 to which the nut 36 is bonded or welded, and a lower radially extending mounting flange 70 that has bored openings 72 which are aligned with the openings 64. After the screws 67 have been installed, an optional thin walled cover 74 formed from metal or plastic may be placed over the hollow plastic body 60 to hide the mounting screws 67. Cover 74 is held in place by the tubing support 30 which the installer attaches to the base 32 by bolt 34 after the cover 74 has been put in place as shown in FIG. 4. The upright base 32 serves as a pedestal for tubing support 30 which can rotate about the center of the bolt 34 so that it can be moved during installation to any desired angle for placing the grab railings in the position required by the specifications for that installation. Once the location of each base 32 is established, the mounting screws 67 can be placed in any convenient position because the bosses are not in place when the base is mounted. However, even if they were, the tubing support 30 is able to be turned in either direction to position the railings so that the screw holes will not be covered by the bosses 56, 58, thus facilitating installation.

Figure 7:
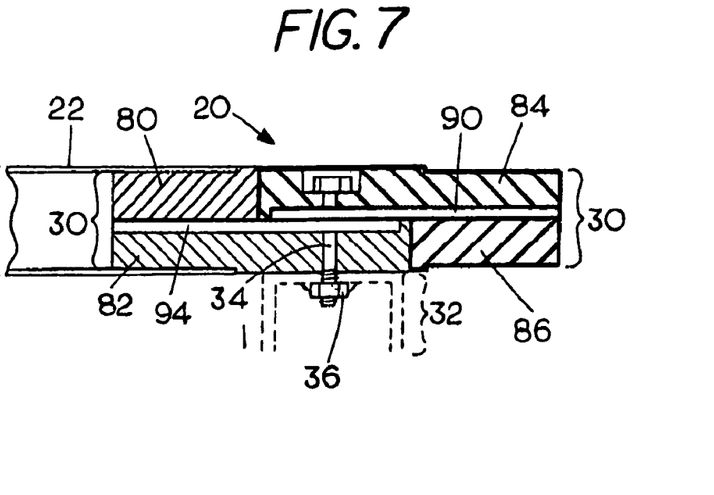
FIG. 7 is a vertical cross-sectional view taken on line 7-7 of FIG. 6.
Figure 7A:
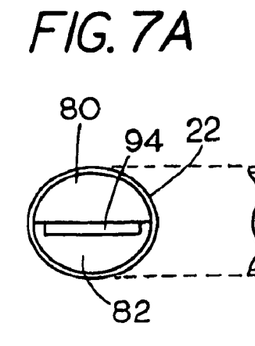
FIG. 7A is a left end view of the connector of FIG. 7.
Figure 8:
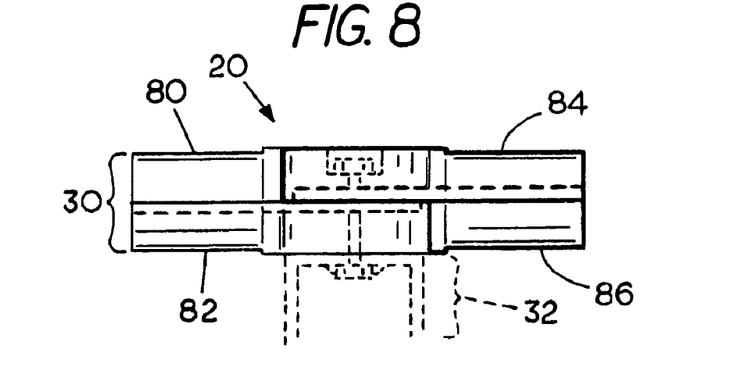
FIG. 8 is a side elevational view of the connector of FIGS. 5-7.
Figure 9:
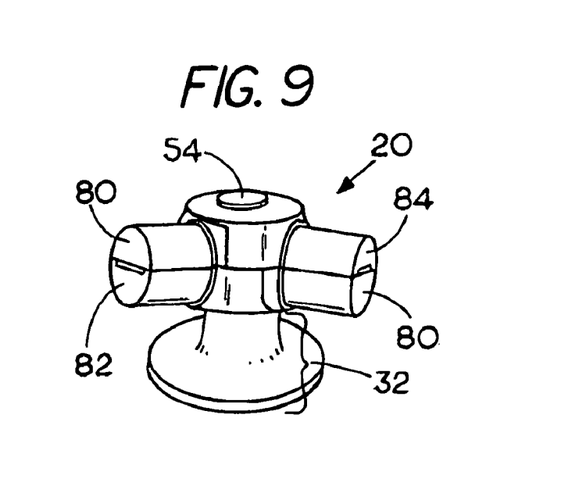
FIG. 9 is a perspective view of the adjustable connector 20 of FIGS. 5-8 on a slightly smaller scale.

Refer now to FIGS. 5-9 which illustrate the adjustable connector 20 in more detail. The base 32 which serves as a pedestal for the adjustable connector 20 is the same modular base 32 described above and shown in FIGS. 2-4. The same modular base 32 is used in all of the connectors to be described as a pedestal for rotatably supporting the tubing support at its upper end by means of the bolt 34 or other suitable fastener. The tubing support 30 of FIGS. 5-9 is also split longitudinally into upper and lower halves, which in this case are designated 80 and 82 at the left and 84 and 86 at the right with upper and lower halves 84 and 82 overlapping and in contact along a horizontal bearing surface 88 (FIG. 5) to define a joint for enabling the boss 80, 82 at the left to be pivoted with respect to a boss 84, 86 about a vertical axis 88 at the center of bolt 34 which acts as a pivot pin. In this case, a longitudinal recess 84a is provided in the lower surface of member 84 to accommodate a flat reinforcement plate 90 and the lower tubing support half 82 is provided with an upwardly opening recess 92 to receive a steel reinforcing plate 94 having a bored opening 96 aligned with a similar opening 98 in plate 90 for the bolt 34. Plate 90 overlaps plate 94 as best seen in FIG. 7. During installation, the base 32 is mounted first as described above in the correct position required for each particular railing installation. The tubing support 30 is then attached to base 32 by means of the bolt 34 which is secured to the nut 36 that is bonded or welded inside the base 32. Once the plates 90 and 94 have been positioned, the screws 50 can be screwed in place or, optionally, this can be done at the factory. The cap 54 is then placed over the bolt 34. The oval, i.e., out of round configuration of the boss 80, 82 is clearly shown in FIG. 7a. This feature prevents the tubing sections 22 from turning or rotating on the supporting bosses during use, thus providing secure support for the user.

Figure 10:
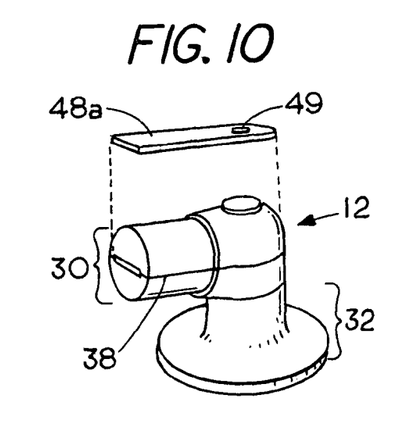
FIG. 10 is a perspective view of an end fitting connector 12 of FIG. 1 showing its reinforcing plate in exploded position.
Figure 11:
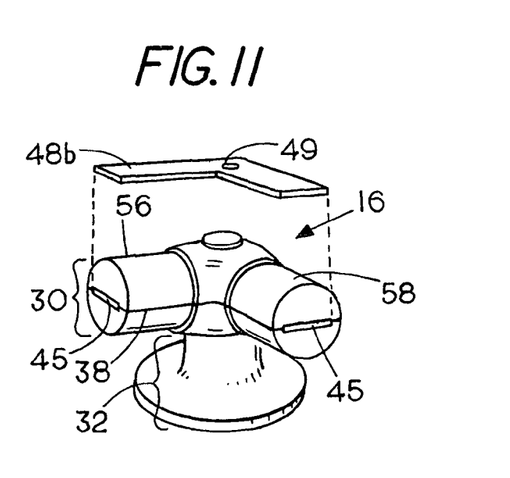
FIG. 11 is a perspective view of an L connector 16 of FIG. 1 in accordance with the invention showing its reinforcing plate in exploded position.
Figure 12:
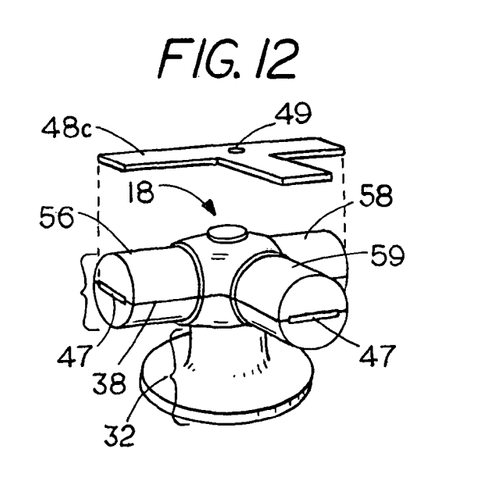
FIG. 12 is a perspective view of a T connector 18 in accordance with the invention showing its reinforcing plate in exploded position.
Figure 13:
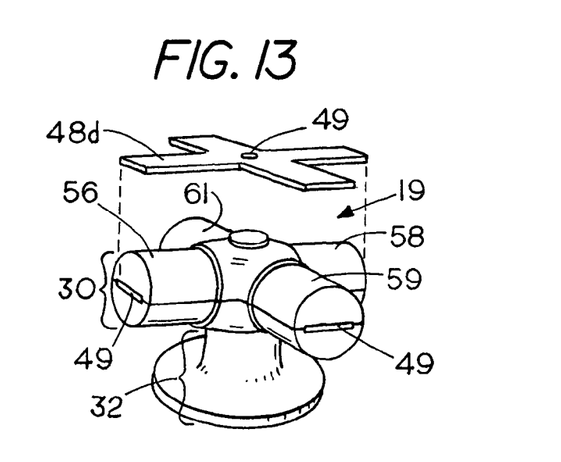
FIG. 13 is an X connector 19 in accordance with the invention showing its reinforcing plate in exploded position.

Refer now to FIGS. 10-13 which show, respectively, an end connector 12 with a single boss in FIG. 10, an L-shaped connector 16 in FIG. 11, a T connector 18 in FIG. 12, and an X connector 19 in FIG. 13; all with identical modular bases 32 that serve as a pedestal for holding the tubing support on a wall or other surface. In each of FIGS. 10-13, the tubing support is similar to that described in FIGS. 2-4 except that in FIG. 10 there is only one boss 56 and the metal reinforcing plate shown in an exploded view in FIG. 10 at 48a is of the appropriate length to fit between the halves of the end connector 12 which like connector 14 is split along longitudinal separation line 38 and includes a recess for plate 45a, the left end of which can be seen in FIG. 10. Like the metal reinforcing plate 48 in the support 12 of FIG. 3, the plate 48a which is recessed within support 30 at separation line 38 as in FIGS. 3 and 4 is bored at 49 to receive the bolt 34 (not shown in FIG. 10) the lower end of which is screw-threaded into the nut 36 of the base 32. The tubing supports 30 in all of FIGS. 10-13 are similarly constructed, the bolt 34 securing the tubing support assembly 30 to base 32 in each case as shown in FIGS. 3 and 4 so that it is free to rotate on the base 32 about the axis of the bolt 34.

In FIG. 11 the tubing support 16 is L-shaped as is the metal reinforcing plate 48b located at the separation line 38. In FIG. 12 the tubing support assembly 18 has a T-shaped configuration. The metal reinforcing plate 48c is similarly shaped to fit between the upper and lower halves of the tubing support 30 which separate along longitudinally extending separation line 38. In FIG. 13, the tubing support assembly 19 has an X configuration, as does the metal reinforcing plate which is designated 48d. Each of the tubing support assemblies of FIGS. 11-13 are provided with recesses designated 45, 47, and 49, respectively, which are shaped in each case to receive the corresponding metal reinforcing plate shown and described. Thus in summary, the tubing support of FIGS. 2-4 has two aligned bosses 56, 58, the tubing support 30 of FIG. 10 has a single boss 56, the L-shaped tubing support 16 of FIG. 11 has a pair of bosses 56 and 58 that are at right angles to one another, the T-shaped tubing support 18 of FIG. 12 has two aligned bosses 56 and 58 and an intermediate boss 59 at right angles thereto while the tubing support 19 of FIG. 13 has aligned bosses 56 and 58 similar to those described in FIG. 2-4 and another pair of bosses 59 and 61 at right angles to the first pair.

Figure 14:
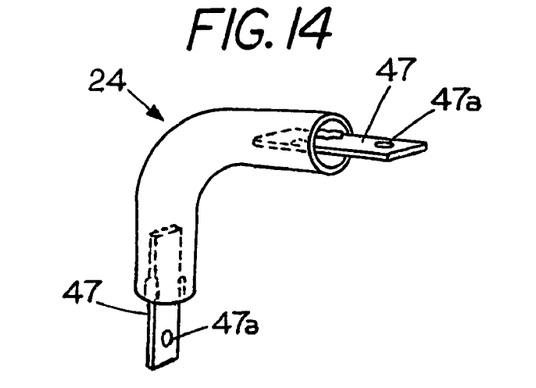
FIG. 14 is a tubular elbow railing section 24 in accordance with the invention.

Refer now to FIG. 14 which shows the section of tubing 24 of FIG. 1 with a right angle bend to provide an inside or outside elbow that can be connected between any of the tubing supports described. To provide the appropriate strength and to simplify installation, the elbow 24 is provided with a rectangular metal reinforcing plate 47 at each end similar to plate 48 that are positioned at right angles to one another and are normal to the plane of the elbow. Each of the reinforcing plates 47 is bonded, e.g., by spot welding or other suitable welding method to the interior surface of the elbow 24 and each is provided with a punched opening 47a that is appropriately positioned so that the bolt 34 can pass through it when the elbow is mounted on the boss of one of the tubing supports 30 of any of FIGS. 2-13. The location of the elbow 24 after being installed can be seen in FIG. 1. One of the bolts 34 shown in FIGS. 3 and 4 passes through each of the bored openings 47a to secure the elbow 24 in place between connectors 12 and 14 (FIG. 1).

In the event that one of the tubing supports such as 18 in FIG. 1 has bosses which do not require tubing sections 22, the bosses can be covered by end extensions 100 that are held in place in any suitable manner, e.g., by retaining screws extending the grip surface beyond the mounting base by about 4" per end. Tubing sections 22 can be made of metal or plastic and can be cut from any commercially available stock, thereby reducing installation and production costs.

Figure 15:
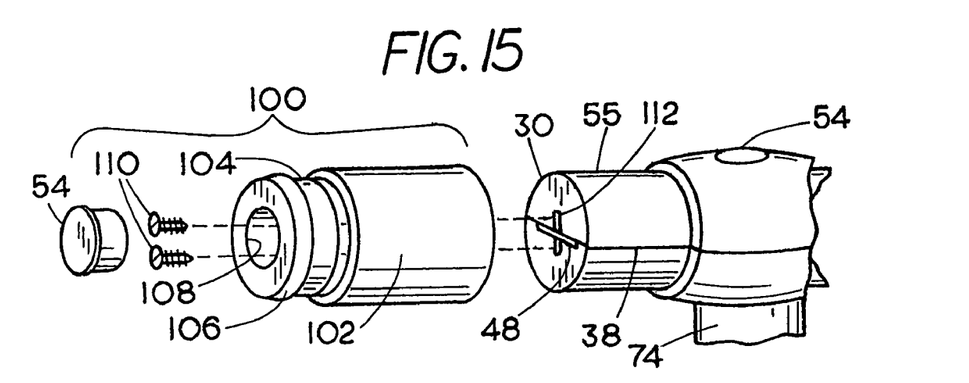
FIG. 15 is an exploded view showing an end extension.

The end extensions 100 will now be described in more detail in connection with FIG. 15 in which the same numerals refer to corresponding parts already described. First, a metal tube 102 that is typically 3" or 4" long is placed over the boss of tubing support 30. A metal or plastic end cap 104 of cylindrical shape sized to fit into the open end of the tube 102 is inserted into the free end of the tube. The end cap 104 includes a circular rim or bead 106 near its outer end for limiting insertion of the end cap into the tube 102. In the center of the end cap 104 is a bore 108 which extends partially through the end cap 104 and includes openings for a pair of retaining screws 110 that are threaded into a slot 112 in the end of the boss of tubing support 30. Once the screws 110 are in place, they are covered by a plug 54 which is the same plug 54 that is used at the center of each fitting. The plug is held by friction within the bore 108. The tubular extension 102 is properly dimensioned to fit over any of the bosses of any of the plastic fittings described herein above.

An important advantage of the invention is the variety of decorative possibilities provided by the plastic surfaces of the tubing support units 30, yet the invention has more than enough strength to meet code and industry requirements. The invention can be installed more easily than previously because the invention allows workmen to install the mounting screws 67 before attaching the tubing support 30 so that none of the screws or screw holes are located beneath or concealed by the ends of the tubing 22. Because the tubing support assembly is able to pivot about a vertical axis that is perpendicular to the wall or floor surface on which the connector is mounted at the center of bolt 34, minor angular adjustments in the grab tubing can easily be made if needed thereby facilitating the installation process. The invention is therefore appealing from an aesthetic viewpoint both visually and tactilely because when the connector assemblies and interconnected tubing sections are made of plastic resin, they will be warm to the touch while being rugged in construction, strong enough to meet all building codes, and can at the same time be installed with greater precision and less effort than prior tubular grab railings. Tubing sections 22 can be made of metal or plastic and can be cut from any commercially available stock, thereby reducing production costs.

In a modified form of the invention which is also contemplated, the separation line 38 is eliminated and the metal reinforcing plate 48 is molded in situ so that the upper and lower halves of the tubing support 30 are integral with one another. In that case, the plate 48 is positioned between upper and lower molding dies (not shown) prior to injecting plastic resin into the mold as will be understood by those skilled in the art.

Many variations of the present invention within the scope of the appended claims will be apparent to those skilled in the art once the principles described herein are understood.

What is claimed is:

1. A reinforced connector assembly for supporting a tubular grab railing, comprising:

(a) a tubing support portion that is split longitudinally along a separation line into an upper half and a lower half, the upper half having a generally planar downwardly facing surface with a downwardly opening recess therein and the lower half having an upper generally planar surface with an upwardly opening recess therein such that the recesses confront one another (b) said tubing support including a pair of bosses, one such boss being located at a first end of the tubing support and the other boss being located at a second end of the tubing support;

(c) a reinforcing plate adapted for placement in a sandwiched structure between the upper and lower halves of the tubing support and disposed within said recesses;

(d) each such boss being constructed and arranged to have a sliding fit within a separate rigid tubing section of a tubular railing that is not a part of said connector assembly such that a rigid tubing section of said railing would enclose each such boss thereby surrounding the sandwiched structure therein;

(e) the tubing support portion has a plurality of the bosses that are aligned or at right angles to one another and a part of the tubing support portion between said plurality of bosses is exposed to view when a section of a tubular grab railing has a sliding fit over the bosses;

(f) a base portion comprising a tubular reinforcing member with upper and lower ends and with an aperture formed centrally through an upper transverse end wall thereof, said base portion having a rotational relationship relative to said tubing support portion and having a laterally extending flange at a lower end-thereof, the flange including a plurality of apertures for inserting screw fasteners for fastening the reinforced connector assembly to a support surface; and (g) a bolt fastener that acts as a pivot pin for insertion through the tubing support portion, the reinforcing plate, and the aperture in the upper end of the reinforcing member of the base portion to secure the base portion to the tubing support portion and to allow the tubing support portion to pivot on the base portion.

2. The assembly of claim 1 wherein each boss and an end of the tubular railing are oval in cross-section whereby the tubing cannot be rotated on each boss.

3. The assembly of claim 1, a second such assembly that is spaced apart from said assembly and a tubing section which extends between the assembly and said second assembly with the ends of said tubing section mounted upon a boss of each of said assemblies to define a section of grab railing.

4. The assembly of claim 1 wherein the upper and lower halves of the tubing support are joined together by means of a fastener located within at least one boss and the fastener extends between the upper and lower halves of the tubing support.

5. The assembly of claim 1 wherein each boss has a selected diameter to fit within a tubular grab railing and an adjacent diameter of the tubing support portion between the bosses is greater than the diameter of each boss so as to be substantially equal to the diameter of the tubular grab railing.

6. The assembly of claim 1 wherein the reinforcing member is molded in situ in the tubing support portion.

7. The assembly of claim 1 wherein the bosses comprise left and right pivotally related bosses, including a right boss with a portion overlapping the left boss along a horizontal bearing surface to define a joint for enabling the left boss to be pivoted with respect to the right boss about the bolt fastener and the reinforcing plate comprises a pair of pivotally related overlapped reinforcing plates that each extend into one of the bosses and are overlapped at the joint therebetween.

8. The assembly of claim 1 wherein the bosses are in alignment with one another or at right angles to one another.

9. A grab bar adapted to serve as a safety railing in bathrooms and around showers and bath tubs including a reinforced connector assembly comprising:

(a) a tubing support portion that is split longitudinally along a separation line into an upper half and a lower half, the upper half having a generally planar downwardly facing surface with a downwardly opening recess therein and the lower half having an upper generally planar surface with an upwardly opening recess therein such that the recesses confront one another;

(b) said tubing support including a pair of bosses, one such boss being located at a first end of the tubing support and the other boss being located at a second end of the tubing support;

(c) a reinforcing plate adapted for placement in a sandwiched structure between the upper and lower halves of the tubing support and disposed within said recesses;

(d) each such boss being constructed and arranged to have a sliding fit within a separate rigid tubing section of a tubular grab railing such that the rigid tubing section of said railing encloses each such boss thereby surrounding the sandwiched structure therein;

(e) the tubing support portion has a plurality of the bosses that are aligned or at right angles to one another and a part of the tubing support portion between said plurality of bosses is exposed to view between the sections of the tubular grab railing that have a sliding fit over the bosses;

(f) a section of tubular grab railing is mounted upon the tubing support portion over each such boss such that the reinforcing plate serves to strengthen a connection between the tubular grab railing section on one boss and the tubular grab railing section on another boss;

(g) a base portion comprising a tubular reinforcing member with upper and lower ends and with an aperture formed centrally through an upper transverse end wall thereof, said base having a rotational relationship relative to the tubing support portion and having a laterally extending flange at a lower end-thereof, the flange including a plurality of apertures for inserting screw fasteners for fastening the reinforced connector assembly to a support surface; and (h) a bolt fastener for insertion through the tubing support portion, the reinforcing plate, and the aperture in the upper end of the reinforcing member of the base portion to secure the base portion to the tubing support portion.

* * * * *